United States Patent [19]

Grondin, deceased et al.

[11] Patent Number: 5,234,010
[45] Date of Patent: Aug. 10, 1993

[54] APPARATUS AND METHOD FOR CLEANING EXTENDED WEAR SOFT CONTACT LENSES

[76] Inventors: Edward A. Grondin, deceased, late of Dalton, Ga.; by Carol F. Grondin, executrix, P.O. Box 4368, Dalton, Ga. 30721

[21] Appl. No.: 604,388

[22] Filed: Oct. 29, 1990

Related U.S. Application Data

[63] Continuation of Ser. No. 261,106, Oct. 24, 1988, abandoned, which is a continuation-in-part of Ser. No. 5,127, Jan. 20, 1987, abandoned.

[51] Int. Cl.⁵ .................................................. B08B 3/00
[52] U.S. Cl. ..................................... 134/140; 134/158; 134/162; 134/901; 206/5.1
[58] Field of Search ............... 134/140, 143, 154, 158, 134/162, 901; 206/5.1; 366/248, 270

[56] References Cited

U.S. PATENT DOCUMENTS

| | | | |
|---|---|---|---|
| 2,496,506 | 2/1950 | Wagner | 134/140 X |
| 3,614,959 | 10/1971 | Schollmaier et al. | 206/5.1 X |
| 3,623,492 | 11/1971 | Frantz et al. | 134/162 X |
| 3,862,748 | 1/1975 | Grise et al. | 366/248 |
| 4,653,519 | 3/1987 | Kanner | 134/140 |
| 4,700,729 | 10/1987 | Thaler | 134/143 X |
| 4,776,360 | 10/1988 | Shih | 134/140 |

*Primary Examiner*—Harvey C. Hornsby
*Assistant Examiner*—Stephen F. Gerrity
*Attorney, Agent, or Firm*—Bailey & Hardaway

[57] ABSTRACT

A device for cleaning extended wear soft contact lenses using liquid cleaning media is provided having a closed vessel for containing the liquid at a suitable level to wash the lenses which are rotated about a vertical axis in an upright position across the path of rotation with a swirling action imparted to the liquid with limited turbulence resulting in a gentle effective cleaning action.

5 Claims, 1 Drawing Sheet

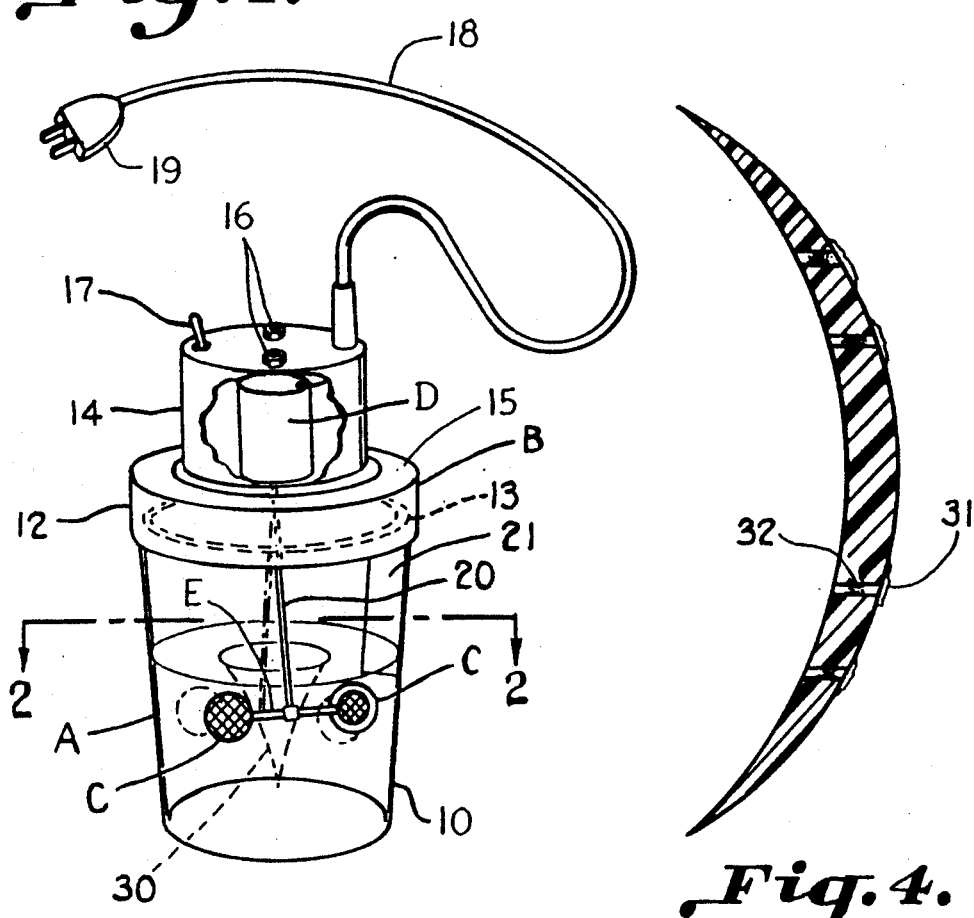
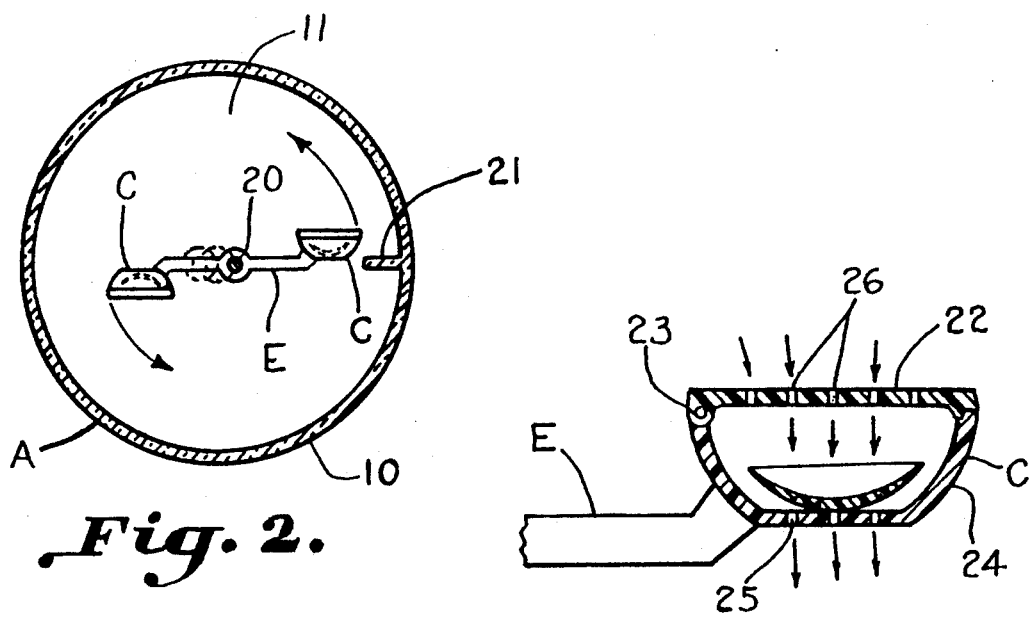

APPARATUS AND METHOD FOR CLEANING EXTENDED WEAR SOFT CONTACT LENSES

This application is a continuation of application Ser. No. 07/261,106, filed Oct. 24, 1988, (now abandoned which is a continuation-in-part of application Ser. No. 07/005,127, filed Jan. 20, 1987.

BACKGROUND OF THE INVENTION

Mechanical apparatus has been provided for cleaning hard lenses in a liquid cleaning medium utilizing separate baskets arranged in a horizontal alignment in the path of liquid rotation through the use of external power operated means in the form of a magnetic drive including rotation through a magnetic coupling to the lenses baskets. Such apparatus is not effective for use in cleaning soft contact lenses. Since the soft lenses are presented in a sidewise position to the liquid, there is minimal resistance to rapid rotation producing excessive turbulence such as would damage a soft lens of the extended wear variety. Other United States patents which illustrate apparatus for cleaning objects in liquid include the following: 692,663, 1,963,563; 2,150,560; 2,277,919; 2,414,971; 2,721,567; and 3,297,309.

Accordingly, it is an important object of this invention to provide a mechanical device for effectively cleaning soft contact lenses utilizing a gentle scrubbing action of liquid to which a limited turbulence has been imparted. It has been found that the apparatus and method of the present invention are effective in removing the deposits which develop upon extended use with the soft contact lenses of the extended wear variety whether such deposits are protein, mucous or calcium. It is believed that such impurities or deposits within the pores of capillary tubes form interstices extending from the back to the front of the soft contact lenses. It is believed such tubes become clogged by impurities and such deposits over an extended period of use. It is contemplated that liquids such as normally used to clean soft contact lenses be employed with the apparatus hereof including enzyme applications, disinfectant applications and the final saline wash to purge the pores of the lenses of deposits and chemicals utilized in previous applications.

SUMMARY OF THE INVENTION

Apparatus and method has been provided for cleaning soft extended wear contact lenses wherein external power operated means rotate a pair of vertically supported baskets for presenting the lenses at right angles to the liquid as the lenses are rotated in a horizontal plane within the liquid.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating an apparatus constructed in accordance with the present invention, FIG. 2 is a sectional plan view taken on the line 2—2 in FIG. 1, FIG. 3 is an enlarged sectional plan view illustrated on one of the baskets of the present invention with its connection, and FIG. 4 is a sectional side elevation illustrating a soft lens with the deposits thereon which are sought to be removed through the cleaning action.

DESCRIPTION OF A PREFERRED EMBODIMENT

Apparatus for cleaning extended wear soft contact lenses utilizing liquid cleaning media is illustrated including a vessel A for containing liquid cleaning media. A top B is provided for the vessel providing a seal between the top and the vessel. A pair of laterally spaced foraminous baskets C support the lenses in upright laterally spaced positions for rotation through the liquid about a vertical axis at substantially right angles to a path of rotation of said baskets through the liquid. Power operated means D is positioned exteriorly of the vessel for rotating the interconnected baskets on the path of rotation through the liquid creating a swirling action in said liquid.

Means E connect the baskets in laterally spaced aligned relation to the vertical axis with concave surfaces of said lenses leading passage through the liquid. Means are preferably provided to impart limited turbulence to the liquid during passage of the lenses therethrough.

The vessel A is preferably constructed of plastic and may be of the general shape of a Ball jar. If desired the cross section, instead of being cylindrical, may be generally square or of some other shape to impart greater turbulence to the liquid during cleaning of the lenses. The vessel A includes a side wall 10 and a bottom 11. A depending side 12 of a top B extends over a rim 13 of the vessel and provides a seal preventing the splashing of liquid outside the vessel. The top B has an upper compartment 14 centrally positioned on an upper end 15 of the top B. The compartment 14 carries a motor D which is attached in position through spaced bolts 16. A switch 17 is provided for starting the motor which is preferably in the form of a 3 amp DC motor which is energized through the line 18 carrying a plug 19 for insertion in a bathroom plug or other suitable electrical outlet. A vertical shaft in substantial alignment with a vertical axis is illustrated at 20, and such is preferably slightly bent laterally in an angle of about 5° to provide additional or limited turbulence to the liquid. A baffle 21 extends downwardly into the liquid and is carried by the vessel inwardly thereof. The baskets which position the lenses in vertical disposition across the path of travel of the baskets through the liquid are attached by a connecting means E to the vertical shaft 20. The baskets C have a cover 22 which is pivoted on one hand as at 23 to a body portion 24 of the baskets. The cover, the leading side of the basket as it travels through the liquid, has openings 26 therein while a rear of the body portion has openings 25 to permit liquid to flow therethrough to engage the concave surface of the lenses as illustrated in FIG. 3.

It will be observed in FIG. 1 that a vortex in the liquid is formed as at 30. Thus, there is a very nearly laminar flow of the liquid at the speed of rotation of the baskets in the path of travel of the baskets. The angular eccentricity of the shaft at a lower end causes wobbling of the baskets resulting in additional turbulence to promote cleaning. It will be noted in FIG. 4 that calcium deposits are illustrated at 31 in the pores 32 within the soft lenses such as shown in FIG. 4. Preferably this surface is remote from that presented to the liquid during cleaning in accordance with the present method.

A timer (not shown) may be utilized if desired by incorporating same in the motor circuitry. The procedure to run a cycle on lenses that are not in discorded shape is as follows.

Use four (4) enzyme tablets with enough saline solution to cover the baskets and run for one hour. Use enough disinfect solution to cover baskets and run for one hour. Then put in enough saline to cover baskets and run for one hour. To run a cycle on lenses in condition which would normally cause discording, use enough saline to cover the baskets with ten (10) enzyme tablets and run for ten hours. Then disinfect as above, but use dialy cleaner directly on lenses with small amount of baking soda between thumb and finger and run for three hours. Then run in saline solution for three hours.

It is important to note that the pair of laterally spaced foraminous baskets support the lenses in laterally spaced positions while retaining the lenses in upright disposition across a path of rotation of the baskets through the liquid with concave surfaces of the lenses facing leading sides of the baskets preventing the lenses from reorienting to positions with the concave surfaces facing away from the leading sides of the baskets.

While a preferred embodiment of the invention has been described using specific terms, such description is for illustrative purposes only, and it is to be understood that changes and variations may be made without departing from the spirit or scope of the following claims.

What is claimed is:

1. Apparatus for cleaning extended wear soft contact lenses having deposits in pores and on a convex side thereof utilizing liquid cleaning media comprising:
   a vessel for containing liquid cleaning media;
   a top for said vessel;
   said top having an upper end and an upper compartment positioned on said upper end;
   a pair of laterally spaced foraminous baskets supporting said lenses in laterally spaced positions while retaining said lenses in upright disposition across a path of rotation of the baskets through the liquid with concave surfaces of said lenses facing leading sides of said baskets preventing said lenses from reorienting to positions with said concave surfaces facing away from said leading sides of said baskets;
   means connecting said baskets in a fixed relation transversely spaced about a vertical shaft at substantially right angles to said path of rotation of said baskets;
   said baskets arranged in laterally spaced aligned relation to said vertical shaft with concave surfaces of said lenses leading passage through the liquid;
   said liquid engaging said concave surfaces of the lenses remote from said convex side having deposits thereon; and
   power operated means located on said upper end of said top and removable with said top positioned in driving relation for continuously rotating said interconnected baskets in a single direction on said path of rotation through the liquid creating a swirling action in said liquid.

2. The structure set forth in claim 1 wherein said baskets are fixed adjacent a free lower end of said vertical shaft.

3. The structure set forth in claim 1 wherein said vertical shaft is bent laterally at an angle of no greater than 5° as a means for imparting limited turbulence to the liquid.

4. The structure set forth in claim 1 wherein said lenses are loosely supported within said baskets in upright disposition across said path of rotation of the baskets through the liquid.

5. The structure set forth in claim 1 wherein said baskets each include a cover with a plurality of openings therein and a body portion, a rear of said body portion having a plurality of openings therein, said cover being pivotally connected to said body portion; whereby each of said baskets permit liquid to flow therethrough to engage the concave surface of said lens.

* * * * *